UNITED STATES PATENT OFFICE.

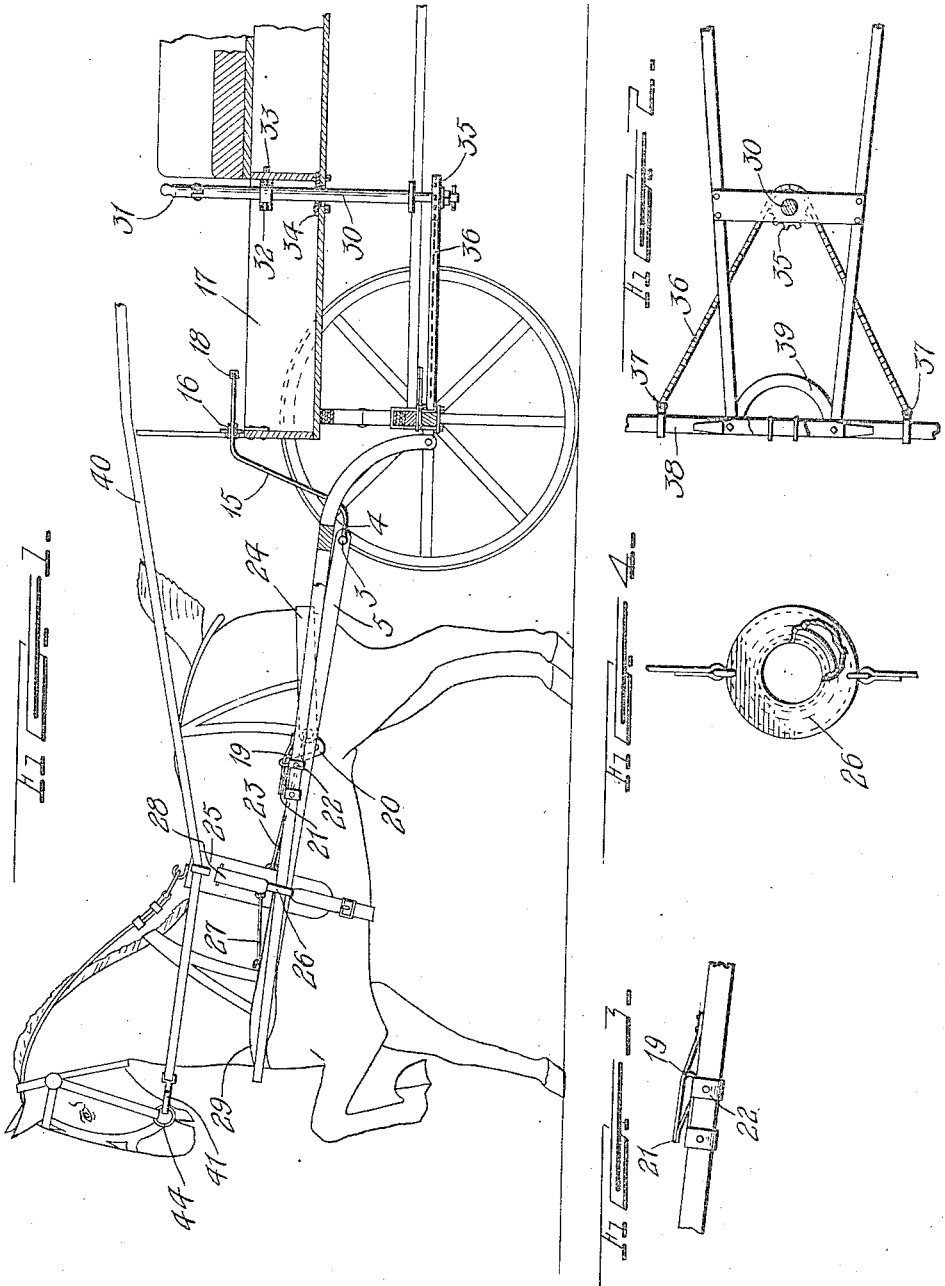
G. SCHLEICHER.
HORSE DETACHER.
APPLICATION FILED JAN. 21, 1916.
1,232,721.
Patented July 10, 1917.
2 SHEETS—SHEET 1.

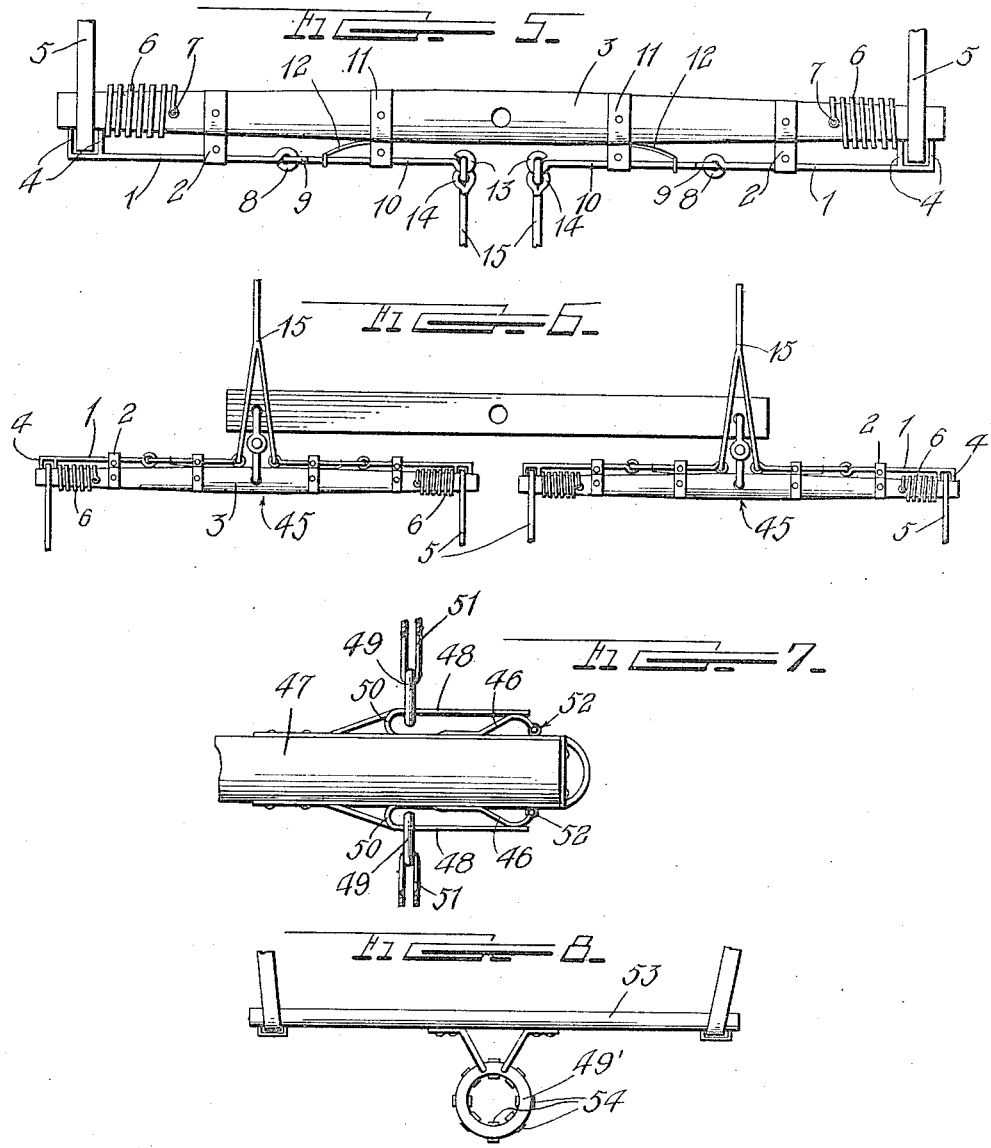

GEORGE SCHLEICHER, OF BELLEVILLE, ILLINOIS.

HORSE-DETACHER.

1,232,721.  Specification of Letters Patent.  Patented July 10, 1917.

Application filed January 21, 1916. Serial No. 73,423.

*To all whom it may concern:*

Be it known that I, GEORGE SCHLEICHER, a citizen of the United States, residing at Belleville, in the county of Saint Clair and State of Illinois, have invented certain new and useful Improvements in Horse-Detachers, of which the following is a specification.

This invention has relation to certain new and useful improvements in horse detachers, and has for its primary object the provision of means whereby a horse may be readily detached from a vehicle by operation of releasing cords by the driver without the necessity of the latter leaving his seat.

The invention has for another object the provision of a horse detacher which will be of improved and novel construction, may be easily operated and will insure proper release of the draft animal without injury to the harness.

A further object of the invention resides in the provision of a horse detacher which will be of simple construction and operation, inexpensive, and adapted for use upon a vehicle regardless of the number of draft animals to be connected with the same.

With the above and other objects in view, the invention resides in the novel construction, combination, and arrangement of parts as hereinafter set forth in the specification, pointed out in the claims, and shown in the drawings, in which—

Figure 1 is an elevation of the horse detacher applied to a one-horse vehicle, parts of which are shown in section;

Fig. 2 is a detail plan of the vehicle guiding mechanism with the steering mechanism with the steering shaft in section;

Fig. 3 is a detail view of one of the spring clamp members mounted upon the vehicle shafts;

Fig. 4 is a detail view of one of the shaft encircling loops;

Fig. 5 is a plan of the whiffletree and parts carried thereby;

Fig. 6 is a plan of a slightly modified form of the principal parts of the invention as arranged for a two-horse vehicle;

Fig. 7 is a detail view of the outer end of the tongue of the two-horse vehicle to show the parts of the invention mounted upon the same;

Fig. 8 is an elevation of a neck yoke to be applied upon the forward end of the tongue in place of the device shown thereon in Fig. 7.

Referring more particularly to the drawings in which similar reference characters designate corresponding parts throughout the several views, 1 designates the pivoted trace-holding members which are mounted in suitable supporting brackets 2 carried by the whiffletree 3 adjacent the ends of the same. The trace-holding members 1 are each provided at their free outer ends with parallel ears 4 extended at right angles to the main portion of said members 1 and normally engage against one face of the whiffletree 3 with the ends of the traces 5 positioned therebetween. Springs 6 are mounted upon the ends of the whiffletree 3 and secured, as shown at 7, with their free ends bearing against the innermost ears 4, the spring 6 being normally compressed. The opposite ends of the members 1 are bent to form the loops 8 within which similar loops 9 are engaged, said loops 9 being formed upon one end of the pivoted operating rods 10. The operating rods 10 are mounted in suitable brackets 11 carried by the whiffletree 3 and are resiliently retained in normal position, and in alinement with the members 1 by means of suitable springs 12 mounted upon said operating rods 10 and bearing against the whiffletree 3. The inner ends of the operating rods 10 are also bent to form loops 13, with which are connected by the rings 14 or other suitable means, the releasing cords or operating cords 15 which may extend over the guide rollers 16 on the dashboard of a vehicle 17 and be connected, as indicated at 18, so as to be in ready reach of the driver.

From the foregoing, it will be readily seen that should a pull be exerted upon the operating cords or releasing cords 15, the operating rods 10 will be caused to swing upon their pivots and against the tension of the springs 12, causing the trace holding members 1 to swing in a reverse direction, thereby permitting the springs 6 to act upon the ends of the traces 5 and force the latter from the ends of the whiffletree 3.

A spring clamp 19 is secured upon each shaft to receive the breeching strap 20 and includes a spring plate 21 secured by its lower end to the bracket 22 upon which the spring clamp 19 is mounted, the free end of the spring plate 21 pressing against the main arm of the clamp 19 to prevent accidental disengagement of the breeching strap 20. A connecting strap 23 is also provided to connect the breeching 24 with the saddle 25 to hold the breeching in proper position and cause the breeching strap 20 to be withdrawn from the clamp member 19 as the draft animal moves from between the shaft. The shaft pocket 26 is engaged upon each shaft in the usual manner but in order to prevent the shaft pocket 26 from binding and catching upon the shaft after the draft animal has been released, I have provided a second connecting strap 27 which connects the pocket supporting member 28 with the breast strap 29. It will therefore be seen that when the draft animal is released by operation of the operating or releasing straps 15 all of the harness connected with the shafts of the vehicle will be automatically disengaged from the same as the draft animal moves from between the shafts. In order that the driver may guide the vehicle as it continues to move after the draft animal has been released, I have provided a steering rod 30 having a pivoted upper handle section 31 within ready reach of the driver, said steering rod 30 being rotatably mounted in a collar 32, secured, as shown at 33, to a stationary portion of the vehicle, said steering rod 30 also extending through a collar 34 engaged in the floor of the vehicle and having a sprocket wheel 35 mounted upon its free lower end. A sprocket chain 36 is engaged around the sprocket wheel 35, and has its opposite ends connected, as shown at 37, with the front axle 38 at opposite sides of the fifth wheel 39.

In Figs. 6 and 7 I have shown a slightly modified form of the invention, in which the trace holding members 1 and parts connected with the same, as well as the springs 6 are duplicated in order that the invention may be applied to the swingletrees 45 of a two-horse vehicle. This form of the invention should include the spring plates 46 positioned upon the opposite sides of the vehicle tongue 47, at the outer end of the same and having their free ends bowed outwardly for engagement with the ring guide arms 48 which have their inner ends bent inwardly and secured to the tongue 47. The ring guide arms 48 serve to guide the rings 49 upon the outer end of the tongue 47 and have inwardly curved portions 50 for limiting inward movement of said rings 49. It will be understood that the rings 49 have engaged therein the usual straps 51 leading to the collars of the draft animals. The spring members 46 are also provided in their free extremities with anti-frictional rollers 52 in order that the rings 49 may be readily withdrawn from the tongue 47 when the draft animals are released, with the minimum amount of friction.

In Fig. 8 I have shown a slightly modified form of the invention in which the spring arm 46 and guide arms 48 may be dispensed with and the ring 49' carried by a yoke 53 and provided with a plurality of anti-frictional rollers 54 to insure free movement of the ring 49' upon the vehicle tongue. This form may be especially adapted for use upon tapered tongues.

While the preferred embodiments of the invention have been shown and described, it will be understood that minor changes in the details of construction, and arrangement of parts may be resorted to within the scope of the appended claims without departing from the spirit of the invention or sacrificing any of the advantages of the same.

What is claimed is:

1. A horse detacher comprising the combination with a whiffletree and traces engaged with the ends of the same, of trace holding members pivoted upon said whiffletree, each member having a forked end to engage the end of a trace, means for simultaneously rocking said trace holding members to disconnect the forks from the traces, and a resilient means for forcing each of the released traces from said whiffletree.

2. A horse detacher comprising the combination with a whiffletree and traces removably mounted upon the same, of a trace holding member pivotally mounted intermediate its ends upon said whiffletree near each end thereof, each member having a projecting fork on one end to engage the end of a trace, two operating levers, each connected at one end with one of said trace holding members, flexible means connected with the opposite ends of said operating levers and extended to the vehicle on which the whiffletree is mounted for disconnecting said fork from the traces, resilient means acting on each of said operating levers for holding the forks in engagement with the ends of the traces and preventing unintentional release thereof, and a spring encircling each end of the whiffletree and bearing on the fork for pressing upon and forcing each of the traces from said whiffletree when released from a fork.

In testimony whereof I affix my signature in presence of two witnesses.

GEORGE SCHLEICHER.

Witnesses:
 WM. H. PFINGSTEN,
 OTIS GIVENROD.